United States Patent [19]

Tomasi

[11] Patent Number: 4,644,428
[45] Date of Patent: Feb. 17, 1987

[54] ADJUSTABLE MECHANISM FOR RELEASABLY COUPLING FLOPPY DISK TO DRIVE SPINDLE

[76] Inventor: Philip Tomasi, P.O. Box 1186, Canoga Park, Calif. 91304

[21] Appl. No.: 651,431

[22] Filed: Sep. 17, 1984
(Under 37 CFR 1.47)

[51] Int. Cl.[4] .................. G11B 5/016; G11B 17/02
[52] U.S. Cl. .................................................. 360/99
[58] Field of Search ............................ 360/97, 99

[56] References Cited

U.S. PATENT DOCUMENTS

| 4,040,107 | 8/1977 | Bryer | 360/99 |
| 4,413,294 | 11/1983 | Beijer | 360/97 |
| 4,485,464 | 11/1984 | Shimaoka | 360/97 |
| 4,541,025 | 9/1985 | Sidhu et al. | 360/97 |

FOREIGN PATENT DOCUMENTS 57-33466  2/1982  Japan ................................ 360/97

OTHER PUBLICATIONS

Pierson, "Energy-Dampening . . . Machine", IBM Tech. Disc. Bull., vol. 21, No. 12, May 1979, p. 4965.

Primary Examiner—Robert S. Tupper
Attorney, Agent, or Firm—Bogucki, Scherlacher, Mok & Roth

[57] ABSTRACT

A floppy disk drive incorporates a cantilevered arm carrying at its free end a floppy disk positioning and clamping cone, the arm being pivotally mounted along the rear edge of the disk drive base frame. A longitudinal control shaft, rotatable by a control lever on the front panel of the drive, includes a cam riding in contact with a cam surface in a central region of the arm. The rear extremity of the control shaft is journaled in a variable height bearing block mounted on the base frame. A single screw controls the height of the bearing block and thus the clamping pressure exerted by the positioning and clamping cone on the floppy disk, which pressure may thereby be precisely and quickly adjusted. The invention is especially advantageous in half-height, direct drive floppy memory apparatus in which height and spindle torque limitations impose substantial design, fabrication and servicing constraints.

The invention also provides for easy yet precise adjustment of the timing of the output pulse of a photosensor used to detect a sector index hole in the floppy disk.

18 Claims, 6 Drawing Figures

ADJUSTABLE MECHANISM FOR RELEASABLY COUPLING FLOPPY DISK TO DRIVE SPINDLE

FIELD OF THE INVENTION

This invention relates generally to rotating magnetic memories of the kind employing interchangeable, flexible or floppy disks and, more particularly, to a mechanism for precisely adjusting the force with which the disk is clamped into engagement with a drive element.

BACKGROUND OF THE INVENTION

Floppy disk drives are mechanisms for transferring data to and from floppy disks which have become virtually standardized media in the industry. The floppy disk is enclosed in a square envelope and has a central aperture which is used to position and then rotate the disk within the envelope.

Floppy disk drives are made to substantially standard outside dimensions, inasmuch as original equipment manufacturers which install them in their data processing systems desire to provide standard receptacles into which units from different manufacturers can be inserted. There are thus now "full-height" and "half-height" drives which, although they differ in internal component layout, are essentially interchangeable from the user's standpoint.

When a floppy disk is inserted in the receiving slot in the front panel of a drive, it moves into position in which the edge of the central aperture is in alignment with a rotatable spindle having an upper flange surface and a central recess. The spindle is driven by a motor directly or through a belt arrangment.

Although different mechanisms are used to initiate drive operation, including automatic actuators which respond to full insertion and lock-in of the disk envelope, a common and often preferred technique is to utilize a manual actuator to begin operation. Turning of a control lever at the front panel, for example, is utilized to generate a sequence of actions in which a pivotable arm carrying a spring-loaded positioning and clamping cone is moved down toward the disk. The cone is aligned with the central axis of the disk, as well as the rotatable spindle on the opposite side. As the cone enters the central aperture, compliant fingers or petals on the cone act against the edge of the central aperture to make the disk concentric with the central axis, so that the recording tracks on the disk are precisely placed and concentric about the central axis. In its final stage of downward movement, the cone clamps the disk against the upper flange of the spindle with a force dependent principally upon the final position of the cone arm and the characteristics of the compression spring that loads the cone. Downward movement of the cone arm is also utilized to control a switch which, after an appropriate delay, actuates the spindle motor and starts the floppy disk spinning within its envelope.

The so-called "half-height" floppy drive places a number of contraints on the designer because the same performance and interchangeability are required as with the much larger full height design. Accordingly, the principal components of the drive must be designed and packaged to be compatible with the smaller available volume. While this can be done quite readily with complex or precision made parts, the drives must also be cost competitive while meeting the needed precision and interchangeability requirements. This means that while extensive testing and adjustment can be done in theory, practical economic factors dictate that the number of parts should be kept to a minimum and that the number of adjustments must be simplified and minimized. Existing designs for positioning and adjusting the positioning cone mechanism are less than satisfactory in this respect. For size and cost considerations, they often employ a short pivotable arm mounted to one side of the floppy disk with a pivot spaced just outside the periphery of the floppy disk. An actuator forces the pivot arm downwardly toward the floppy disk so that the positioning cone at the end of the arm can be urged into registration with the drive spindle on the other side. With a relatively short pivot arm length, it is possible to utilize a stamped, sheet metal construction for cost reduction purposes. However, parts formed by these mass production techniques at suitably low cost have dimensional variations, so that adjustments must be provided for in the design. This is particularly true when the design is such that the misplacement of the positioning cone relative to the nominal central axis of the floppy disk, and the final engagement pressure of the positioning cone against the hub that is underneath, reflect a possible buildup of a number of tolerance variations. For example, using a rotatable control lever for actuating a cam which displaces the cone arm, the position of the control lever shaft can vary, as can the size or relationship of the cam mounted on the shaft. The position and shape of the pivotable cone arm as well as the position of the positioning cone relative to the pivot arm can also vary substantially. If the manufacturing variations all happen to fall to one side of the allowable tolerance ranges, the net result may well be that floppy disks are not interchangeable between drive units. In addition, the clamping of the disk to the spindle may either be so loose or so tight that the disk is not properly driven. The force with which the disk is pressed into driving engagement with the spindle is especially critical where the spindle is directly driven by the spindle motor. Such drive schemes are becoming prevalent in half-height disk drives to conserve space and to reduce the number of parts. In the absence of the torque multiplication furnished by a belt transmission, for example, the speed of direct drive motors is particularly sensitive to the disk clamping force. High force levels requiring drive torques easily produced by belt drives can stall a direct drive motor. Accordingly, there is a need for a mechanism that allows precise adjustment of the disk clamping force in a simple fashion both during production and in the field.

SUMMARY OF THE INVENTION

A floppy disk drive in accordance with a specific, exemplary embodiment of the invention has a standard outer configuration or "form factor" and includes a positioning cone pivot arm offset relative to the spindle axis. The pivot arm has a spring-mounted hinge adjacent the rear margin of the disk drive base frame and a lateral extension at its free end which carries the positioning cone that is movable toward and away from a disk clamping position. The positioning cone is rotatably mounted on the arm, and is biased away therefrom and against a limit stop by means of a compression spring. The pivot arm is an integral structure, preferably incorporating one or more strengthening ribs which resist bending and torsion moments. The arm also incorporates a cam follower surface in a mid-region that is closer to the hinged end than to the free end.

A control shaft extends longitudinally from a control lever at the front panel. The front end of the control shaft is journaled in the front panel and its rear end is carried by an adjustable or variable height bearing block mounted on the base frame. The control shaft carries a cam which engages the cam follower surface on the arm to force the pivot arm down toward the floppy disk against the spring resistance of the hinge upon rotation of the control lever and shaft. The pivot arm, which is relatively long, minimizes the deviation of the entry angle of the positioning cone relative to the vertical rotational axis of the floppy disk.

Quick and precise adjustment of the clamping force exerted by the positioning cone against the disk and spindle is achieved by adjustment of a single screw which determines the height of the variable height bearing block relative to the base frame. This single adjustment is all that is needed to compensate for "tolerance stack-up" in the control shaft, cam, pivot arm and related elements and it directly determines the final engagement position of the positioning arm and consequently the clamping force exerted by the cone.

In accordance with another aspect of the invention, the pivot arm forms a convenient and rigid support for one of the elements of a means for detecting the presence of a sector index hole in the disk. The forward end of the arm is provided with an arcuate slot centered on the axis of rotation. The slot carries a photosensor element, for example, a phototransistor or photodiode. The other element, which may be in the form of a light source such as an LED, is mounted on the base frame in vertical alignment with the photosensor, the light from the LED source intercepting the path of the index hole. Precise adjustment of the timing of the output pulse from the photosensor is achieved by adjusting its position along in the arcuate slot.

BRIEF DESCRIPTION OF THE DRAWINGS

A better understanding of the invention may be had by referring to the detailed description which follows, taken in conjunction with the accompanying drawings, in which.

DETAILED DESCRIPTION OF THE INVENTION

Figure 1:
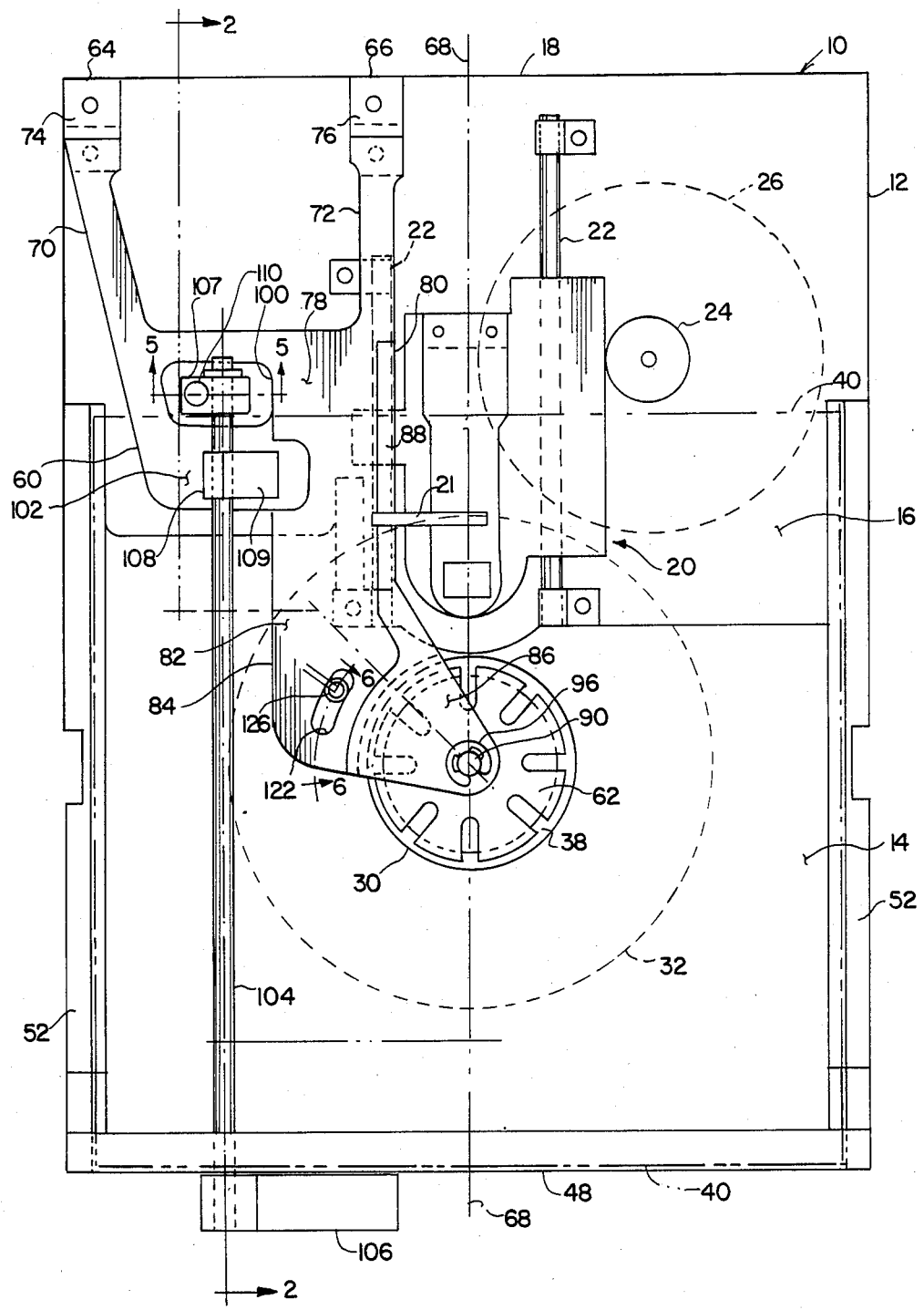
FIG. 1 is a plan view of a half-height floppy disk drive in accordance with the invention in which only the principal, relevant elements are shown, the outline of an inserted floppy disk envelope being depicted in phantom.
Figure 2:
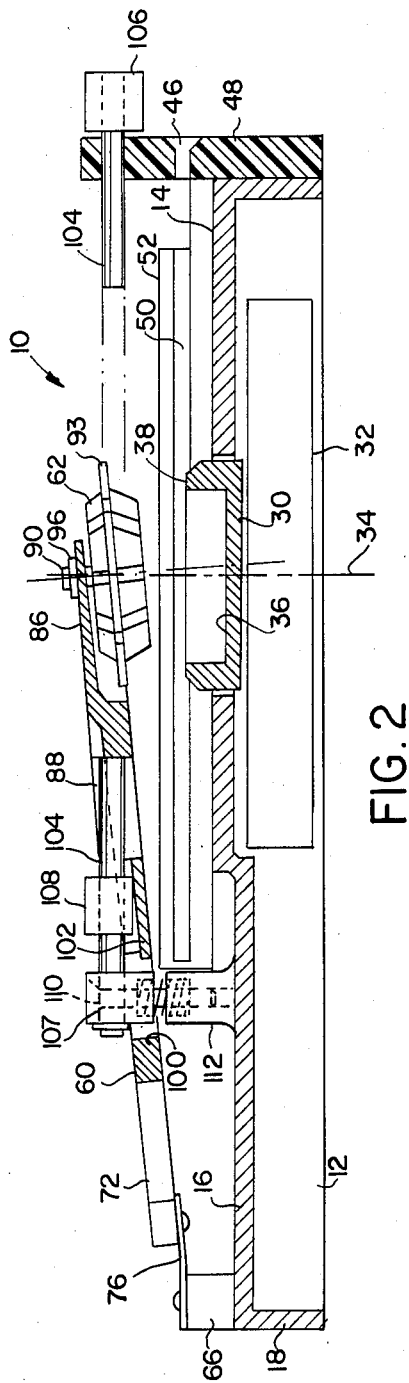
FIG. 2 is a side elevation view, in section, as seen along the line 2—2 in FIG. 1 and showing the pivot arm and the positioning cone assembly carried thereby in the raised position.
Figure 3:
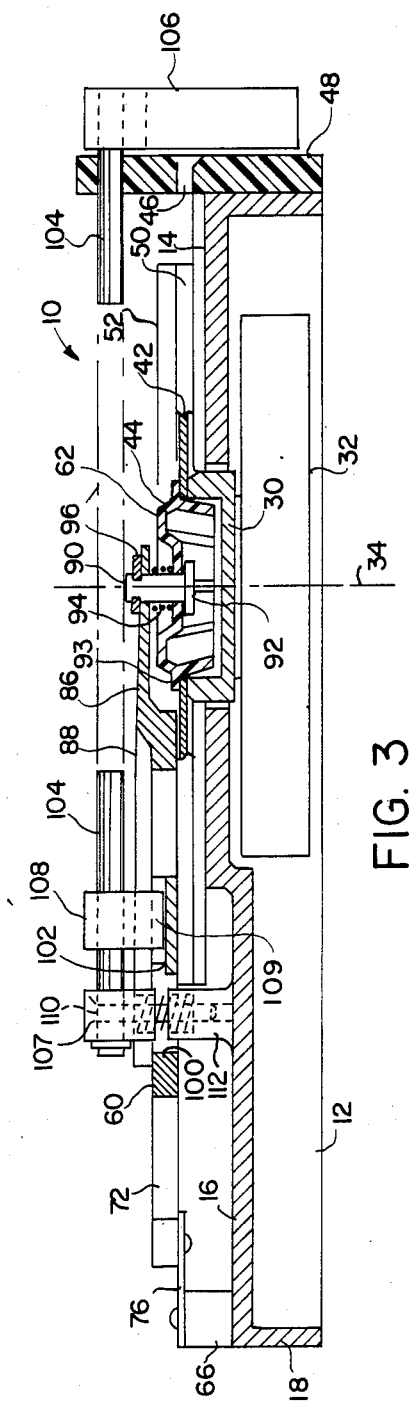
FIG. 3 is a side elevation view, in section, similar to FIG. 2, showing the pivot arm in its lowered position in which the positioning cone is in clamping engagement with the disk.

Referring to FIGS. 1-3, a floppy disk drive 10 in the form of a half-height or low profile 5¼" drive, is depicted in simplified form with only those elements and relationships that are germane to the present invention being shown in detail.

The drive 10 is built around a base plate or frame 12 of essentially standardized dimensions in plan view so that the drive can be fitted within a standardized opening in a housing (not shown) that typically forms part of a higher computer system assembly. The frame is of a stepped configuration having a forward portion 14 that is elevated relative to a rear portion 16 that extends to a rear margin 18 of the drive. This arrangement provides an advantageous way of meeting the volumetric—and particularly the limited height—requirements of the half-height drive. Thus, the rear portion 16 of the frame supports a head carriage assembly 20 at a level which optimally and most compactly positions that assembly relative to the nominal plane of the floppy disk. The carriage assembly 20, which includes an upper head or pressure pad support arm 21, is driven along a pair of guide rods 22 by means of a band drive mechanism including a pulley 24 mounted on the shaft of a stepper motor 26, all as well known in the art.

In the front portion of the frame, a disk drive spindle 30 is carried and directly driven by a motor 32. The spindle 30 is rotatable about a central vertical axis 34 and includes a central recess 36 and a horizontal clamping rim 38 that projects above the floor of the forward portion of the frame.

A floppy disk envelope 40, shown inserted into the drive and containing a floppy disk 42, has a central opening exposing a central aperture 44 of the disk and a margin about that aperture which is adapted to be clamped into engagement with the spindle rim 38 generally in a fashion well known in the art. The floppy disk envelope 40 is inserted through a slot 46 in a front panel 48 of the drive. Longitudinally extending slots 50 in side rails 52 on the forward portion of the frame guide and retain the floppy disk envelope during insertion and operation.

As is also shown in FIGS. 1-3, a cantilevered arm 60 carrying at its free end a disk positioning and clamping cone 62, is mounted to pivot about an axis adjacent and parallel to the rear margin 18 of the base frame while maintaining the positioning cone substantially concentric with the axis of rotation 34. To this end, a pair of spaced-apart pedestals 64 and 66 are mounted on the base frame adjacent the rear margin and to one side thereof relative to a longitudinal axis 68 intersecting the rotational axis 34. One of the pedestals 64 is adjacent a side edge of the base frame while the other is proximate the longitudinal axis 68. The arm 60 has spaced apart legs 70 and 72 which extend forwardly from the pedestals and which are coupled thereto by leaf springs 74 and 76 so configured as to bias the free end of the arm and the positioning cone attached thereto away from the spindle 30. The legs of the arm merge into a central body portion 78 with the outer leg 70 angling inwardly towards the longitudinal axis 68. The central body has an inner edge 80 sufficiently displaced to one side of the longitudinal axis 68 so that the arm 60 clears the head carriage assembly 20 during raising and lowering of the arm.

Projecting forwardly from the central body of the pivot arm and formed integrally therewith, is a beam section 82 which includes an outer, longitudinal edge 84 and a lateral extension 86 that projects inwardly toward the axis of rotation 34. The arm 60 also includes a strengthening rib 88 bridging the central body 78, beam 82 and lateral extension 86. As shown in FIG. 1, the rib 88 may also serve to raise the head assembly support arm 21 away from the disk during loading and unloading thereof. The pivot arm 60 may be formed with additional integral ribs in the upper and/or lower surfaces thereof to provide further resistance to deflection or twisting resulting from bending or torsional loads produced by disk clamping forces.

The positioning cone 62 is mounted on the lateral extension 86 by means of a shaft 90 having an enlarged head 92. Various details of the cone and related supporting elements have been omitted for clarity; suffice it to say that the cone 62 is mounted to rotate freely about the shaft 90 and includes a flange 93 for urging the disk against the spindle rim 38. A compression spring 94, disposed between the undersurface of the lateral extension 86 and the cone 62, normally biases the cone into engagement with the shaft head 92, the shaft being retained by a snap ring 96 received by a groove in the upper extremity of the shaft 90. It will thus be seen that in the raised position of the arm, as shown in FIG. 2, the compression spring 94 urges the cone to a limit stop position in which the snap ring 96 engages the upper surface of the lateral extension 86.

Figure 4:
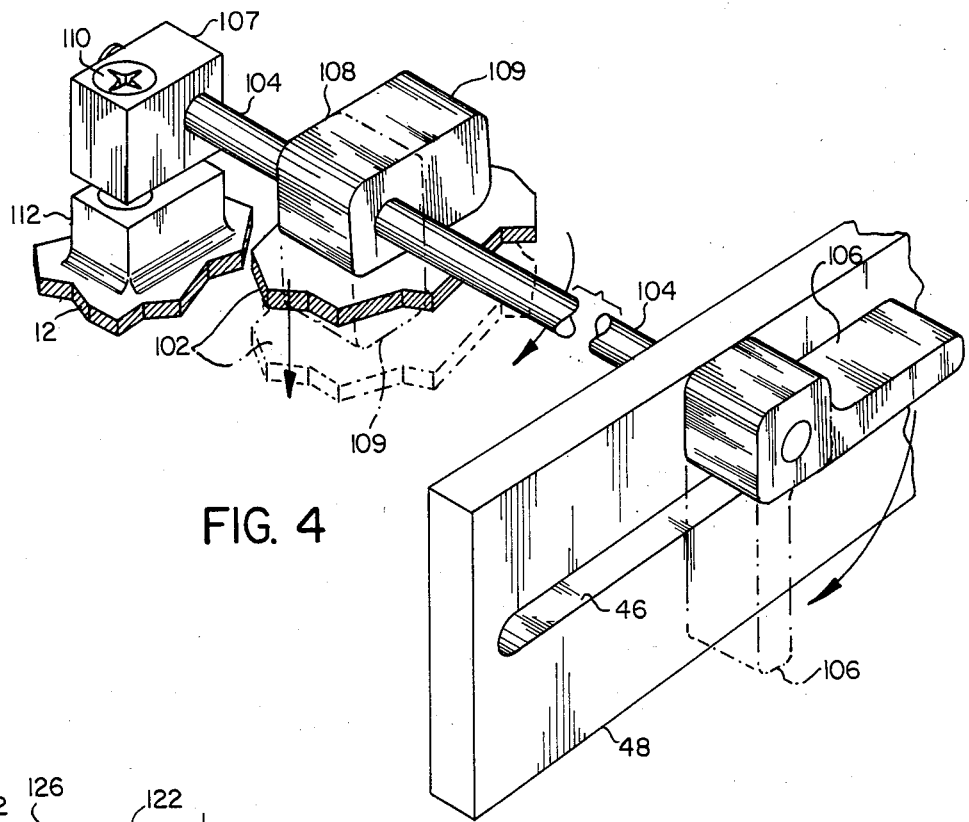
FIG. 4 is a perspective view of the control shaft assembly used to lower the pivot arm.
Figure 5:
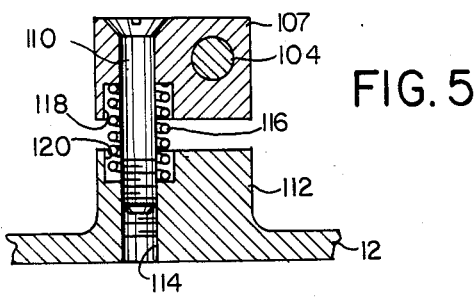
FIG. 5 is a front elevation view, in section, of an adjustable height bearing block carrying the rear end of the control shaft, as seen along the line 5—5 in FIG. 1.

The central body of the pivot arm includes an opening 100 and an adjacent horizontal cam surface 102. Turning now also to FIGS. 4 and 5, a longitudinally oriented control shaft 104 extending from a control lever 106 and journaled at its forward end in the front panel 48, spans the cam surface 102 and is journaled at its rear end in an adjustable height bearing block 107 that protrudes through the opening 100 in the pivot arm. A cam 108 having a lobe 109 and secured to the control shaft 104, rides in contact with the cam follower surface 102 on the pivot arm. As best seen in FIGS. 2–4, when the control lever 106 is turned down and the control shaft thereby rotated, the cam lobe 109 pushes the arm 60 down lowering the positioning cone into the recess 36 within the spindle. It will be seen that the outer edge 84 of the beam 82 is so disposed relative to the shaft 90, that there is no interference between these elements during up and down travel of the pivot arm.

The bearing block 107 is mounted by means of a single adjustment screw 110 on a fixed post 112 projecting upwardly from the base frame and formed integrally therewith. The screw 110 passes through a clearance bore in the bearing block and is received by a threaded hole 114 in the post. A compression spring 116, retained within facing counterbores 118 and 120 in the bearing block and post, respectively, biases the bearing block away from the post and against the head of the adjustment screw 110. It will be evident that rotation of the adjustment screw 110 in one direction or the other raises or lowers the bearing block 17 and the rear end of the control shaft carried thereby, relative to the frame and spindle.

The present invention is structurally and functionally arranged to provide both accurate concentric positioning and precise clamping of the floppy disk, and especially so in the context of a half-height, direct drive floppy disk memory apparatus. The maximum height of the pivot arm 60 is determined by the forward, free end thereof in the raised position of the pivot arm as shown in FIG. 2, the hinged end of the arm lying well below the top surface of the drive because of the two-level configuration of the base frame. This geometry is of additional significance because it provides a region in which the cam follower surface 102 can be engaged from above by the cam 108 without exceeding the height limitations imposed by the half-height drive configuration. Furthermore, the bearing block 107, which projects through the opening 100 in the pivot arm, is readily accessible from above for adjustment. Such adjustment is both quickly performed and precise. With a floppy disk in place and the control lever turned down (FIG. 3), the screw 110 is first turned counterclockwise sufficiently to move the bearing block up to a position in which slippage occurs between the floppy disk and the spindle. The screw 110 is then turned clockwise to move the bearing block down against the bias of the spring 116. In effect, the control shaft 104 is thereby pivoted downwardly about its journal in the front panel 48, causing the cam 108 to progressively lower the free end of the pivot arm. Just at the point that the snap ring 96 is unloaded and can be turned manually, the adjustment is complete. Tolerance variations in the sizes or positions of the different elements such as the pivot arm, control shaft, and so forth, become immaterial even if cumulative, becuase the net resulting error may be compensated for completely by the single adjustment screw 110.

Figure 6:
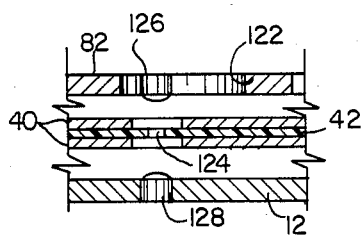
FIG. 6 is a cross section view of a portion of the disk drive shown in FIG. 1, as seen along the section line 6—6, showing the details of the sector index hole detection means.

Referring to FIGS. 1 and 6, formed in the beam 82 of the pivot arm is a curved or arcuate slot 122 that is centered on the axis of rotation 34 and at a radius corresponding to that of a sector index hole 124 formed in the floppy disk. A sensor 126, such as a photodiode or phototransistor, is held at a circumferentially selectable position within the arcuate slot 122. A conventional light source 128, such as an LED, is mounted in the base frame 12 and illuminates the sensor through the index hole when it passes by the sensor position. Adjustment of the position of the sensor 126 within the arcuate slot 122 provides a precise adjustment of the timing of the output signal produced by the sensor. While many floppy disk systems use electronic compensation in combination with a fixed index hole detector to provide a synchronizing pulse to denote the start of a disk revolution, this type of adjustment is unduly time consuming and often cannot cover an adequately wide range. In contrast, by shifting the sensor 126 circumferentially within the curved slot 122, no added fabrication or installation procedure, extensive instrumentation or compensation circuitry is required to obtain a precisely timed index pulse.

What is claimed is:

1. An adjustable loading mechanism for the positioning and clamping cone in a floppy disk drive having a front panel and side and rear edges in a rectangular configuration defined by a base frame, and a spindle for driving a floppy disk, said mechanism comprising:

a pivot arm including spring hinge means along the rear edge of the frame biasing the pivot arm in a direction away from the upper side of an inserted floppy disk, the pivot arm further including a free end intercepting the rotational axis of the floppy disk and carrying a spring-loaded positioning and clamping cone thereon for entering a central aperture of the floppy disk; and control means including a control shaft accessible from the front panel and positioned to intercept a portion of the mid region of the pivot arm, the control means including a cam surface engageable with the mid region of the pivot arm, an interior bearing block receiving the shaft and means for adjusting the height of the bearing block relative to the base frame, rotation of the control shaft engaging the cam surface against the pivot arm to lower the arm, the clamping force exerted by the positioning and clamping cone on the disk being determined by adjustment of the height of the bearing block relative to the base frame.

2. The mechanism as set forth in claim 1 above, wherein the pivot arm is disposed to one side of a longitudinal center axis intersecting the axis of rotation and includes a lateral extension carrying the positioning and clamping cone.

3. The mechanism as set forth in claim 1 above, wherein said pivot arm includes an opening in a central portion thereof, the height-adjustable bearing block being mounted on the base frame by the means for adjusting and extending through said opening.

4. The mechanism as set forth in claim 2 above, wherein the disk drive further includes a head carriage assembly mounted substantially along said longitudinal axis and said control shaft extends parallel to said longitudinal axis, the pivot arm including inner and outer longitudinal edges so positioned relative to the head carriage assembly and shaft to permit the pivot arm to clear said assembly and shaft during up and down movement of said arm.

5. A floppy disk drive apparatus comprising:

a base frame having a front panel, a rear margin and longitudinally extending side margins and an upper, horizontal surface, said frame receiving a floppy disk having a central aperture;

floppy disk drive means carried by said frame and including a motor-driven spindle projecting from the upper surface of the frame and rotatable about a vertical axis normal to the upper surface of the frame, the spindle having an annular, horizontal planar surface for engagement by the floppy disk;

a carriage, supporting at least one read/write head, movable longitudinally along a radius extending from said vertical axis to access circular data tracks on said floppy disk;

a disk positioning and clamping cone disposed substantially on the vertical axis of rotation, said cone being operative to center the floppy disk relative to the axis of rotation and to clamp the disk into driving engagement with the horizontal surface of the spindle;

an arm having one end carrying the disk positioning and clamping cone and another end hingedly connected to the frame, said arm being biased to urge the disk positioning and clamping cone away from the spindle, said cone being movable relative to the arm along the axis of rotation and including a spring urging the cone away from the arm to a limiting position; and means for displacing the arm about its hinged end against the bias applied to the arm to thereby lower the disk positioning and centering cone relative to the disk to center the disk and clamp it against the spindle surface, the arm displacing means including (i) a longitudinally-extending shaft having a front end journalled in and projecting from the front panel and a rear extremity; (ii) a bearing block mounted on the frame, the rear extremity of the shaft being journalled in said bearing block; (iii) a control lever secured to the front end of the shaft for rotating the shaft, and (iv) a cam secured to the shaft intermediate its ends and operative to contact and displace the arm relative to the shaft upon rotation of the shaft, means for adjusting the position of the bearing block in a vertical direction whereby, with the disk positioning and centering cone in clamping engagement with the disk, adjustment of the arm relative to said cone along the axis of rotation is permitted to predetermine the force with which the cone clamps the disk.

6. An apparatus, as defined in claim 5, in which:

the arm has a first, generally longitudinal portion and a second portion, the first portion extending forwardly from said hinged end and lying to one side of a longitudinal center line intersecting the vertical axis of rotation, the second portion projecting from the first portion toward said center line and carrying the disk positioning and clamping cone.

7. An apparatus, as defined in claim 6, in which:

said arm includes and arcuate slot substantially centered on the axis of rotation;

and which apparatus further includes:

means for detecting a sector index hole in the floppy disk, said detecting means including an element providing a source of light and an element for sensing the presence of said light, one of said elements being disposed in said arcuate slot and the other of said elements being mounted on the base frame, the position of said one element in said arcuate slot being chosen to select the timing of a signal produced by said sensor element in response to the presence of the index hole.

8. An apparatus, as defined in claim 5, in which:

the bearing block includes a bore for receiving the rear extremity of said control shaft, and the means for adjusting the position of the bearing block in a vertical direction includes a screw element securing the bearing block to the frame and means for resiliently urging the bearing block away from the frame against the restraint of the screw element.

9. An apparatus, as defined in claim 5, in which:

the arm has an opening therein; and the bearing block projects upwardly through the opening in the arm to receive the rear extremity of the shaft, said shaft lying generally above the level of the arm when the arm is in the lowered, disk-clamping position.

10. An apparatus, as defined in claim 5, in which:

the first portion of the arm has longitudinally-extending outer and inner edges, the shaft being disposed between said outer edge and one of the side margins of the frame, the head carriage assembly being disposed between the inner edge and the other side margin of the frame, whereby the arm clears the shaft and head carriage assembly when the arm is displaced between the disk engaging and disengaging positions.

11. An apparatus, as defined in claim 5, in which:

the arm includes reinforcing means whereby the arm resists deflection due to torsional and bending moments.

12. An apparatus, as defined in claim 5, wherein the disk drive apparatus further includes a sector index hole detector comprising:

a light source element on one side of the nominal plane of the floppy disk and positioned to direct light through said index hole during rotation of the floppy disk;

a photosensor element on the other side of the nominal plane of the disk and positioned to intercept light from said source passing intermittently through said index hole; and an arcuate slot in said arm, the slot being centered on the axis of rotation of the disk, one of the elements being mounted on the frame and the other of said elements being positioned in said slot at a location which selects a desired timing of a signal produced by the photosensor in response to the presence of the index hole.

13. A "half-height" floppy disk drive apparatus comprising:

a base frame of rectangular configuration having a "half-height" front panel, opposite side edges and a rear edge opposite the front panel;

a motor driven spindle for driving a floppy disk, the spindle having a rotational axis and being mounted on the base frame substantially closer to the front panel than to the rear edge;

a pivot arm pivotally coupled to the base frame along a portion of the rear edge at a first end thereof and having an opposite second end thereof intercepting the rotational axis of the spindle and carrying a positioning and clamping member thereon for entering a central aperture in a floppy disk when the floppy disk is positioned on the spindle;

means for biasing the pivot arm to pivot in an upward direction about the first end thereof to hold the positioning and clamping member spaced-apart from the spindle; and means for selectively pivoting the pivot arm in a downard direction about the first end thereof against the upward bias so that the positioning and clamping member enters a central aperture in a floppy disk when the floppy disk is positioned on the spindle, the means for selectively pivoting including a control shaft rotatably mounted within the base frame, the control shaft being accessible from the front panel and extending toward the rear edge from the front panel and intercepting an intermediate portion of the pivot arm between the opposite first and second ends of the pivot arm, a camming member mounted on the control shaft and engaging the intermediate portion of the pivot arm, and a bearing block coupled to the base frame and receiving a portion of the control shaft opposite the camming member from the front panel and including means for adjusting the height of the bearing block relative to the base frame.

14. An apparatus, as defined in claim 13, in which:

the base frame is of stepped configuration so as to have a forward portion adjacent the front panel that is elevated relative to a rear portion adjacent the rear edge, the base frame has a longitudinal center axis extending from the front panel to the rear edge, the pivot arm is disposed to one side of the longitudinal center axis and includes a first portion extending forwardly from the rear edge of the base frame and a second portion projecting from the first portion toward the longitudinal center axis and terminating in the second end of the pivot arm, the control shaft is disposed generally parallel to and spaced-apart from the longitudinal center axis, the apparatus further includes a head carriage assembly mounted substantially along the longitudinal center axis between the spindle and the rear edge of the base frame, and the second portion of the pivot arm is positioned between the control shaft and the head carriage assembly.

15. A floppy disk drive apparatus comprising:

a base frame of rectangular configuration having a front panel;

a motor driven spindle for driving a floppy disk, the spindle having a rotational axis and being mounted on the base frame;

a pivot arm pivotally coupled to the base frame at a first end thereof and having an opposite second end thereof intercepting the rotational axis of the spindle and carrying a positioning and clamping member thereof for entering a central aperture in a floppy disk when the floppy disk is positioned on the spindle;

means for biasing the pivot arm to pivot in an upward direction about the first end thereof to hold the positioning and clamping member spaced-apart from the spindle;

means for selectively pivoting the pivot arm in a downward direction about the first end thereof against the upward bias so that the positioning and clamping member enters a central aperture in a floppy disk when the floppy disk is positioned on the spindle, the means for selectively pivoting including a control shaft rotatably mounted within the base frame and having a first end at the front panel and positioned to intercept a mid-region of the pivot arm between the first and second ends of the pivot arm, a cam mounted on the control shaft and engaging the mid-region of the pivot arm, and a bearing block coupled to the base frame, the bearing block receiving a second end of the control shaft opposite the first end of the control shaft and means mounting the bearing block for adjusting its position in the vertical direction whereby the height of the second end of the control shaft may be varied to adjust the pressure with which the positioning and clamping member enters a central aperture in a floppy disk when a floppy disk is positioned on the spindle.

16. An apparatus, as defined in claim 15, in which:

the bearing block has an aperture therein for receiving a threaded screw, a separate fixed post mounted on the base frame and having a threaded aperture therein receiving the threaded screw, and a spring disposed between the bearing block and the fixed post.

17. A floppy disk drive apparatus comprising:

a base frame of rectangular configuration having a front panel, opposite side edges and a rear edge opposite the front panel, the base frame having a longitudinal center axis extending from the front panel to the rear edge;

a motor driven spindle for driving a floppy disk, the spindle having a rotational axis and being mounted on the base frame at a location which is substantially at the longitudinal center axis and which is substantially closer to the front panel than to the rear edge;

a head carriage assembly mounted substantially at the longitudinal center axis between the spindle and the rear edge of the base frame;

a pivot arm including spring hinge means along the rear edge of the base frame biasing the pivot arm in a direction away from the upper side of a floppy disk positioned on the spindle, the pivot arm having a first portion extending forwardly from the rear edge of the base frame in a direction toward the front panel at one side of the longitudinal center axis and terminating at a mid-region of the pivot arm, the pivot arm further having a second portion projecting laterally from the mid-region toward the longitudinal center axis and terminating at an outer end substantially at the rotational axis of the spindle;

a spring-loaded positioning and clamping cone coupled to the outer end of the pivot arm; and means for selectively pivoting the pivot arm in a downward direction against the bias of the spring hinge means so that the positioning and clamping cone enters a central aperture in a floppy disk when the floppy disk is positioned on the spindle, the means for selectively pivoting including a control shaft rotatably mounted within the base frame generally parallel to and spaced-apart from the longitudinal center axis, the control shaft having a first end coupled to a control lever at the front panel and intercepting the mid region of the pivot arm, a cam mounted on the control shaft and engaging the mid region of the pivot arm, and a bearing block coupled to the base frame, the bearing block receiving a second end of the control shaft opposite the first end of the control shaft and means mounting the bearing block for adjusting its position in the vertical direction.

18. An apparatus, as defined in claim 17, in which:
the first portion of the pivot arm has an opening therein for receiving the bearing block and the pivot arm has inner and outer longitudinal ledges so positioned relative to the head carriage assembly and the control shaft to permit the pivot arm to clear the head carriage assembly and the control shaft during up and down movement of the pivot arm.

* * * * *